(12) United States Patent
DaSilva (10) Patent No.: US 12,276,407 B2
(45) Date of Patent: Apr. 15, 2025

(54) DUAL LIGHT MOUNTING DEVICE AND METHOD OF USE

(71) Applicant: Juan DaSilva, Melbourne, FL (US)

(72) Inventor: Juan DaSilva, Melbourne, FL (US)

( * ) Notice: Subject to any disclaimer, the term of this patent is extended or adjusted under 35 U.S.C. 154(b) by 0 days.

(21) Appl. No.: 18/782,564

(22) Filed: Jul. 24, 2024

(65) Prior Publication Data

US 2025/0035290 A1     Jan. 30, 2025

Related U.S. Application Data

(60) Provisional application No. 63/516,077, filed on Jul. 27, 2023.

(51) Int. Cl.
*F21V 19/00*     (2006.01)
*F16M 13/02*     (2006.01)
*F21Y 103/00*     (2016.01)

(52) U.S. Cl.
CPC ......... *F21V 19/009* (2013.01); *F16M 13/027* (2013.01); *F21Y 2103/00* (2013.01)

(58) Field of Classification Search
CPC .. F21V 19/009; F21V 19/008; F21V 19/0075; F16M 13/027; F21Y 2103/00
See application file for complete search history.

(56) References Cited

U.S. PATENT DOCUMENTS

| | | | |
|---|---|---|---|
| 4,760,506 A | 7/1988 | Mochizuki | |
| D421,142 S | 2/2000 | Bayat | |
| 6,152,573 A * | 11/2000 | Mitchell | G09F 13/04 362/361 |
| 7,152,997 B1 | 12/2006 | Kovacik | |
| 7,465,063 B2 * | 12/2008 | Stillman | F21V 19/009 362/225 |
| 7,861,466 B2 | 1/2011 | Sanborn | |
| 8,992,039 B2 | 3/2015 | Janice | |
| 2007/0223230 A1 | 9/2007 | Trojanowski | |
| 2010/0226124 A1 * | 9/2010 | Kong | F21V 17/02 362/249.07 |

* cited by examiner

*Primary Examiner* — Anne M Hines
(74) *Attorney, Agent, or Firm* — Brennan, Manna & Diamond, LLC (57) ABSTRACT

A dual light mounting bracket device is disclosed. The device features a U-shaped main frame with an aperture for fastener attachment to various surfaces, including ceilings, walls, and floors. A pair of horizontally colinear planar arms extend from the ends of the U-shaped member. A clamp member is attached to each planar arm and each clamp member consists of a rectangular arm and a pair of symmetrical, rubber-coated or plastic-coated curved arms with rounded tips that deviate slightly outward to enhance grip. The curved arms are flexible, enabling lateral movement to accommodate objects of varying sizes. The clamp members secure and accommodate a pair of lights, such as planar LED lights or fluorescent light tubes (i.e., fluorescent light fixtures). The dual light mounting bracket device provides a secure, insulated, and non-damaging hold, suitable for mounting illumination devices or other objects.

20 Claims, 6 Drawing Sheets

DUAL LIGHT MOUNTING DEVICE AND METHOD OF USE

CROSS-REFERENCE TO RELATED APPLICATION

The present application claims priority to, and the benefit of, U.S. Provisional Application No. 63/516,077, which was filed on Jul. 27, 2023 and is incorporated herein by reference in its entirety.

FIELD OF THE INVENTION

The present invention generally relates to the field of LED light or fluorescent light tubes (i.e., fluorescent light fixtures) and mounting brackets. More specifically, the present invention relates to a novel mounting bracket designed to accommodate a pair of LED lights or fluorescent light tubes (i.e., fluorescent light fixtures). The device features two rubber coated or plastic coated clamps sized and configured to support a pair of LED lights or fluorescent light tubes (i.e., fluorescent light fixtures) in a parallel arrangement to improve lighting in any residential or commercial area. The device also features a U-shaped main frame with an aperture for fastener attachment to various surfaces, including ceilings, walls, and floors. Accordingly, the present disclosure makes specific reference thereto. Nonetheless, it is to be appreciated that aspects of the present invention are also equally applicable to other like applications, devices, and methods of manufacture.

BACKGROUND

By way of background, illumination is important in commercial environments for different reasons, including security and safety. Proper lighting can help prevent theft, as poorly lit areas such as warehouses, offices, garages, and storage rooms provide opportunities for thieves to remain hidden and undetected. Inadequate lighting in these spaces not only increases the risk of theft but can also be detrimental to the safety and comfort of individuals working in such environments.

Moreover, poor lighting can strain the eyes, leading to discomfort and decreased productivity. The issue of poor lighting is not only limited to commercial settings but individuals working from home also often face challenges in properly illuminating their workspaces, making it difficult to see items clearly and perform tasks efficiently.

Typically, standard lights such as LED light or fluorescent light tubes (i.e., fluorescent light fixtures) are installed individually rather than in pairs, which can limit the amount of illumination provided. Additionally, hanging lights from ceilings is not always feasible due to structural constraints or the lack of appropriate mounting options. For improving illumination and efficient installation of LED light or fluorescent light tubes (i.e., fluorescent light fixtures), individuals desire an improved light mounting bracket device that overcomes the problems of poor illumination and installation of lights of the prior art.

Therefore, there exists a long felt need in the art for a secure lighting solution that can provide effective means of installing and securing a pair of lights. There is also a long felt need in the art for a novel mounting bracket device that can accommodate a pair of LED lights or fluorescent light tubes (i.e., fluorescent light fixtures). Additionally, there is a long felt need in the art for a unique mounting bracket that can be mounted to a wall, ceiling, or any other surface to secure and elevate the lights. Moreover, there is a long felt need in the art for a unique mounting system that is sized and configured to support a pair of LED lights or fluorescent light tubes (i.e., fluorescent light fixtures) in a parallel arrangement to improve lighting in any residential or commercial area. Further, there is a long felt need in the art for a mounting bracket that is easy to install and use. Furthermore, there is a long felt need in the art for a LED light or fluorescent light tube fixture mounting bracket that enables increased lighting capability and can be used for any commercial or residential environment. Finally, there is a long felt need in the art for a uniquely designed dual mounting bracket that offers easy and convenient light installation in homes, garages, offices, warehouses, and more.

The subject matter disclosed and claimed herein, in one embodiment thereof, comprises a mounting bracket device designed to accommodate a pair of LED lights or fluorescent light tubes (i.e., fluorescent light fixtures) in parallel orientation. The device includes two rubber coated or plastic coated clamps, each clamp includes a pair of C-shaped arms, each arm has a rounded tip, the clamps are secured to a U-shaped frame, wherein the U-shaped frame includes an aperture for mounting the bracket to a wall or a ceiling. Each clamp is configured to receive and accommodate an LED light or fluorescent light tube fixture which is frictionally secured by a pair of C-shaped arms. The LED light or fluorescent light tubes (i.e., fluorescent light fixtures) are positioned in parallel direction to each other for providing enhanced illumination.

In this manner, the dual mounting bracket device of the present invention accomplishes all of the forgoing objectives and provides users with a novel bracket device that is designed to hold a pair of lights, thereby improving illumination efficiency compared to standard single-light installations. The device improves lighting in commercial environments, reducing the risk of theft by eliminating poorly lit areas where thieves can hide. The bracket device can be mounted to any surface and simplifies the process of installing and removing lights, making it accessible for users without requiring professional help. The device helps in providing adequate illumination to prevent eye strain and discomfort, thereby enhancing safety and productivity for individuals working in both commercial and residential settings.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises dual light mounting bracket device. The bracket device comprises a U-shaped main frame with a bottom end and two ends, the U-shaped main frame having an aperture at the bottom end adapted to receive a fastener for attachment to a surface. A first planar arm extends transversely outward from a first end of the U-shaped main frame and a second planar arm extends transversely outward from an opposite second end of the U-shaped main frame. A first clamp member is attached to the first planar arm, the first clamp member includes a pair of symmetrical rubber-coated or plastic-coated curved arms extending upward from opposite ends of a rectangular arm, each curved arm has a rounded tip that deviates away from the curvature of the arm. A second clamp member is attached to the second planar arm, the second clamp member includes a pair of symmetrical rubber-coated or plastic-coated curved arms extending upward from opposite ends of a rectangular arm, each curved arm has a rounded tip that deviates away from the curvature of the curved arm.

In yet another embodiment, the first clamp member secures a first light object between the curved arms and the second clamp members secures a second light object between the curved arms thereof.

In another embodiment, a mounting bracket device designed to accommodate a pair of LED lights or fluorescent light tubes (i.e., fluorescent light fixtures) is disclosed. The device includes two rubber coated or plastic coated clamps, each clamp includes a pair of C-shaped arms, each arm has a rounded tip, the clamps are secured to a U-shaped frame, wherein the U-shaped frame includes an aperture for mounting the bracket to a wall or a ceiling. Each clamp is configured to receive an LED light, a fluorescent light tube, or a fluorescent light fixture which is frictionally secured by the pair of C-shaped arms.

In another aspect, a mounting bracket device is disclosed. The bracket device includes a U-shaped main frame with an aperture adapted to receive a fastener for attachment to a surface, a first arm extends outward from the main frame and a second arm extends outward in the opposite direction from the main frame, a first clamp member is attached to the first arm, the first clamp member comprising a pair of curved arms, each curved arm having a rounded tip and a second clamp member is attached to the second arm, the second clamp member comprising a pair of curved arms, each curved arm having a rounded tip.

In yet another aspect, a method of mounting a pair of lights using a dual light mounting bracket device is described. The method includes the steps of providing a dual light mounting bracket device, the bracket device includes a U-shaped main frame with an aperture adapted to receive a fastener for attachment to a surface, a first clamp member comprising a pair of rubber-coated or plastic coated curved arms, each curved arm having a rounded tip and a second clamp member comprising a pair of rubber-coated or plastic-coated curved arms, each curved arm having a rounded tip, attaching the dual light mounting bracket device to a surface by inserting a fastener through the aperture at the bottom end of the U-shaped main frame, securing a first light or light fixture between the rubber-coated or plastic coated curved arms of the first clamp member, and securing a second light or light fixture between the rubber-coated or plastic coated curved arms of the second clamp member.

In yet another embodiment, the dual light mounting bracket device is attached to a ceiling using a fastener through the aperture at the bottom end of the U-shaped main frame, and the dual light mounting bracket device is hung from the ceiling using a chain connected to the fastener and a pair of lights or light fixtures are secured between the rubber-coated or plastic-coated curved arms of the clamp members.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a secure lighting solution that can provide effective means of installing and securing a pair of lights or light fixtures. There is also a long felt need in the art for a novel mounting bracket device that can accommodate a pair of LED lights or fluorescent light tubes (i.e., fluorescent light fixtures). Additionally, there is a long felt need in the art for a unique mounting bracket that can be mounted to a wall, a ceiling, or any other surface to secure and elevate the lights. Moreover, there is a long felt need in the art for a unique mounting system that is sized and configured to support a pair of LED lights or fluorescent light tubes (i.e., fluorescent light fixtures) in a parallel arrangement to improve lighting in any residential or commercial area. Further, there is a long felt need in the art for a mounting bracket that is easy to install and use. Furthermore, there is a long felt need in the art for a LED light or fluorescent light tube fixture bracket that enables increased lighting capability and can be used for any commercial or residential environment. Finally, there is a long felt need in the art for a uniquely designed dual mounting bracket that offers easy and convenient light installation in homes, garages, offices, warehouses, and more.

The present invention, in one exemplary embodiment, is a method of mounting a pair of lights or a pair of light fixtures using a dual light mounting bracket device. The method includes the steps of providing a dual light mounting bracket device, the bracket device includes a U-shaped main frame with an aperture adapted to receive a fastener for attachment to a surface, a first clamp member comprising a pair of rubber-coated or plastic coated curved arms, each curved arm having a rounded tip and a second clamp member comprising a pair of rubber-coated or plastic coated curved arms, each curved arm having a rounded tip, attaching the dual light mounting bracket device to a surface by inserting a fastener through the aperture at the bottom end of the U-shaped main frame, securing a first light or light fixture between the rubber-coated or plastic coated curved arms of the first clamp member, and securing a second light or light fixture between the rubber-coated or plastic coated curved arms of the second clamp member.

Reference will now be made in detail to the present preferred embodiments of the invention, examples of which are illustrated in the accompanying drawings. Wherever possible, the same reference numerals are used in the drawings and the description to refer to the same or like parts.

Figure 1:
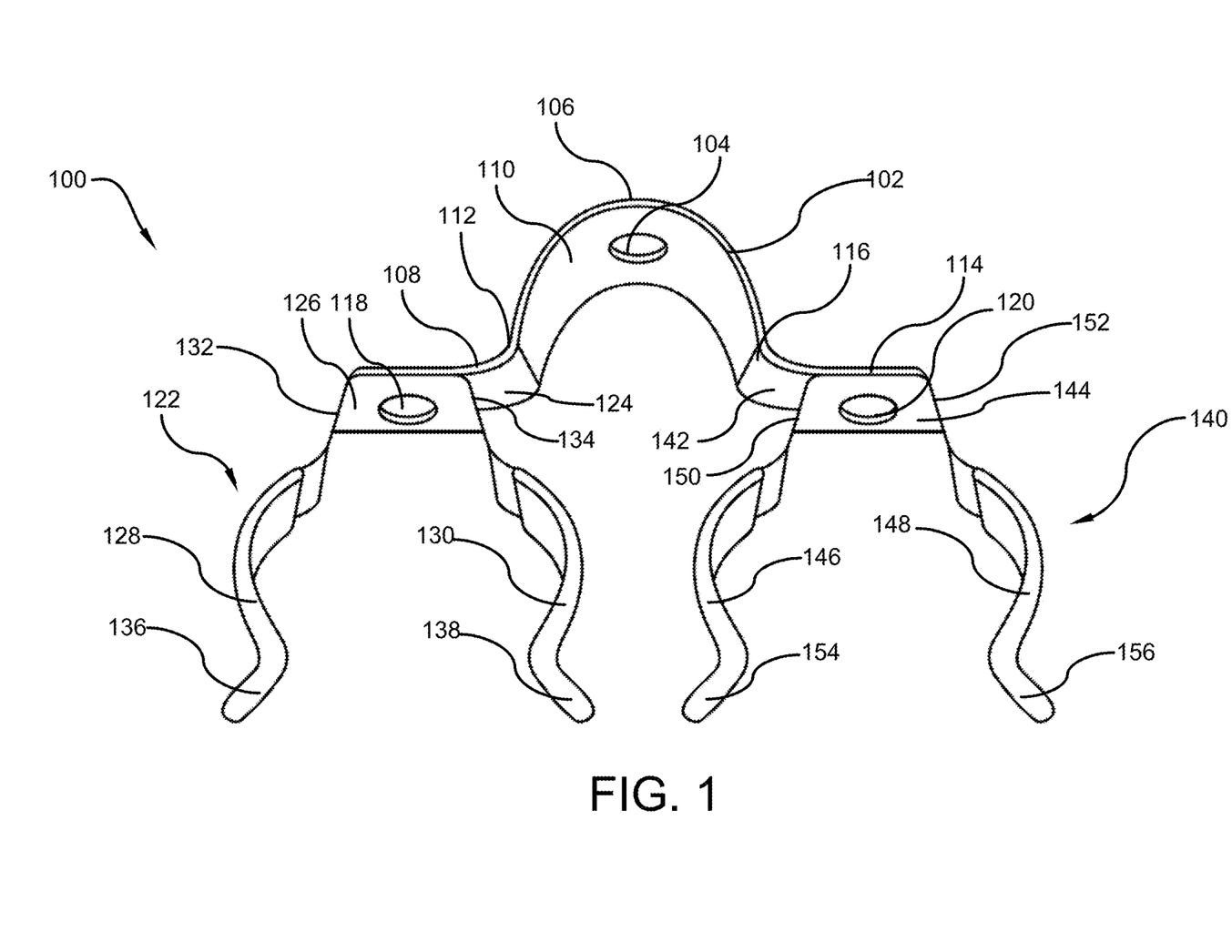
FIG. 1 illustrates a perspective view of the dual light or fixture mounting bracket device of the present invention in accordance with the disclosed structure.

Referring initially to the drawings, FIG. 1 illustrates a perspective view of dual light mounting bracket device of the present invention in accordance with the disclosed structure. The dual light mounting bracket device 100 of the present invention is designed to accommodate a pair of lights such as planar LED light, fluorescent light tubes, or fluorescent light fixtures for providing illumination. The dual light mounting bracket device 100 is a compact device and can be installed on ceilings, walls, floors, and more. More specifically, the flexible curved clamps integrated dual light mounting bracket device 100 includes a U-shaped main frame 102 which includes an aperture 104 at the top end 106 of the U-shaped main frame 102. The aperture 104 is adapted to receive a fastener to attach the dual light mounting bracket device 100 to a surface. A first planar arm 108 extends transversely outward from a first end 112 of the U-shaped member 110 and a second planar arm 114 extends transversely outward from an opposite second end 116 of the U-shaped member 110. The planar arms 108, 114 are horizontally colinear and further, the planar arms 108, 114 and the U-shaped member 110 are integrated and the U-shaped main frame 102 has a one-piece construction.

An aperture 118 is disposed on the first planar arm 108 and a corresponding aperture 120 is disposed on the second planar arm 110. In the preferred embodiment, the planar arms 108, 114 have the same length and the apertures 118, 120 are disposed at the center of the corresponding arms 108, 114. The length of the frame 102 extending from the top end 106 of the frame 102 to the arms 108, 114 is about one inch.

A first clamp member 122 is attached to the upper surface 124 of the first planar arm 108 using the aperture 118 (either welded or using a fastener). The first clamp member 122 includes a rectangular arm 126 and a pair of symmetrical rubber-coated or plastic-coated curved arms 128, 130 extend above from the opposite ends 132, 134 of the rectangular arm 126. The rubber-coated or plastic-coated symmetrical curved arms 128, 130 are preferably C-shaped and each curved arm curves inward towards the centerline of the structure. The first curved arm 128 has a rounded tip 136 that deviates away from the curvature of the arm 128. Similarly, the second curved arm 130 has a corresponding rounded tip 138 that deviates away from the curvature of the arm 130. The rounded tips 136, 138 help to enhance the grip on a light object being held between the curved arms 128, 130.

A second clamp member 140 is attached to the upper surface 142 of the second planar arm 114 using the aperture 120 (either welded or using a fastener). The second clamp member 140 includes a rectangular arm 144 and a pair of rubber-coated or plastic-coated symmetrical curved arms 146, 148 extend above from the opposite ends 150, 152 of the rectangular arm 144. The rubber-coated or plastic-coated symmetrical curved arms 146, 148 are preferably C-shaped and each curved arm curves inward towards the centerline of the structure. The curved arms 146, 148 have corresponding rounded tips 154, 156 and the rounded tips 154, 156 deviate or extend away from the curvature of the arms 146, 148. The rounded tips 154, 156 help to enhance the grip on a light object being held between the curved arms 146, 148.

The curved arms of both the clamp members 122, 140 are flexible and can be moved laterally to accommodate an object therebetween. It will be apparent that the curved arms retain their original position when not pulled laterally by the user and therefore, provide a secure grip on an object accommodated between the curved arms. In some embodiments, the clamps 122, 140 are detachably attached to the corresponding planar arms 108, 114 and alternatively, the clamps can be integrated to the planar arms.

The clamp members 122, 140 can independently hold a LED or any other illumination source between the corresponding rubber-coated or plastic-coated curved arms or C-shaped arms. The rubber-coating can be integrated or can also be detachable and provides insulation and a comfortable grip for accommodating the object therebetween. The rubber coating does not scratch or dent the accommodated object. Although the present disclosure describes the dual light mounting bracket device 100 to accommodate illumination devices, lights, or fixtures, it is to be appreciated that the device 100 can be used for any object including but not limited to decorative items, utility objects, and more.

Figure 2:
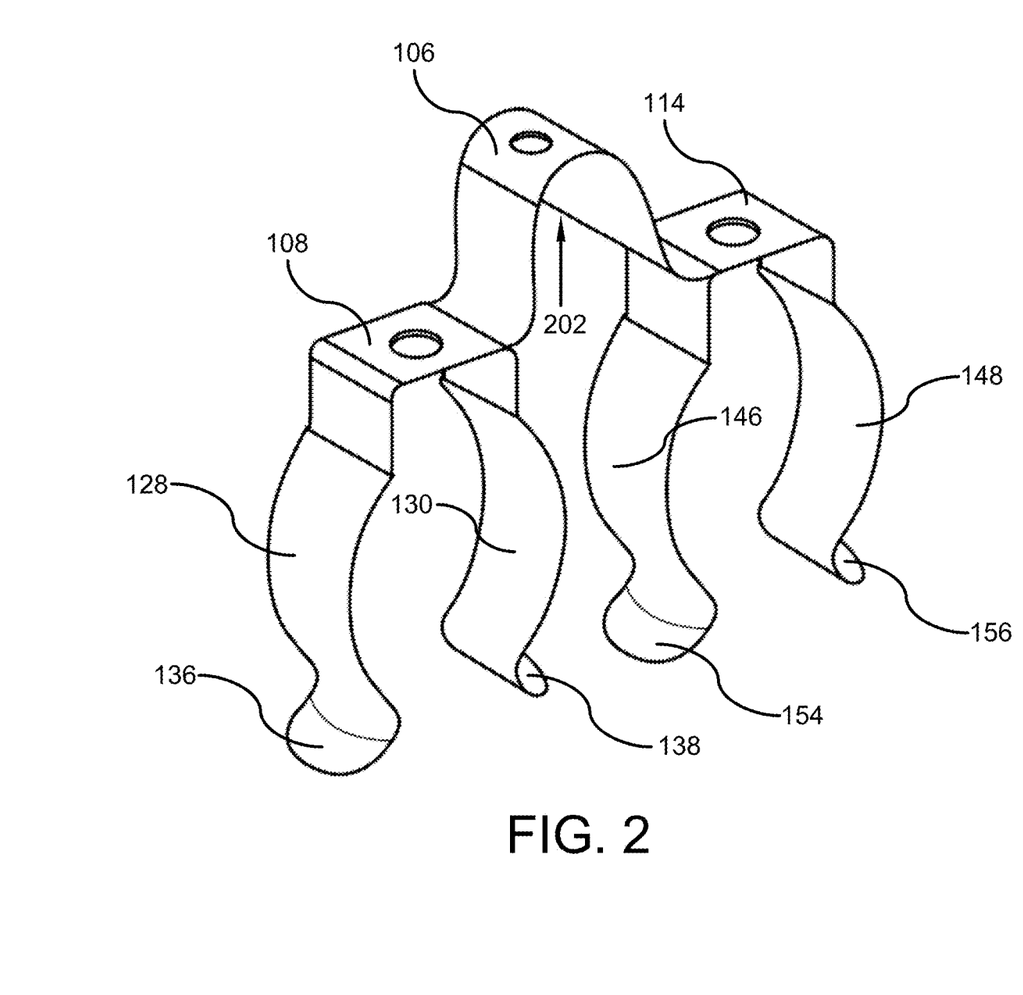
FIG. 2 illustrates another perspective view of the dual light or fixture mounting bracket device of the present invention in accordance with the disclosed structure.

FIG. 2 illustrates another perspective view of the dual light mounting bracket device of the present invention in accordance with the disclosed structure. As illustrated, the clamp members 122, 140 are symmetrical and can be used independently for accommodating objects. Further, the device 100 can be easily mounted using any mechanical equipment like a screw or drill, wherein the space 202 between the clamp members 122, 140 enable a user to easily operate and mount the device 100. The device 100 can be made of any durable, corrosion-resistant, and lightweight material such as steel, aluminum, and more.

Figure 3:
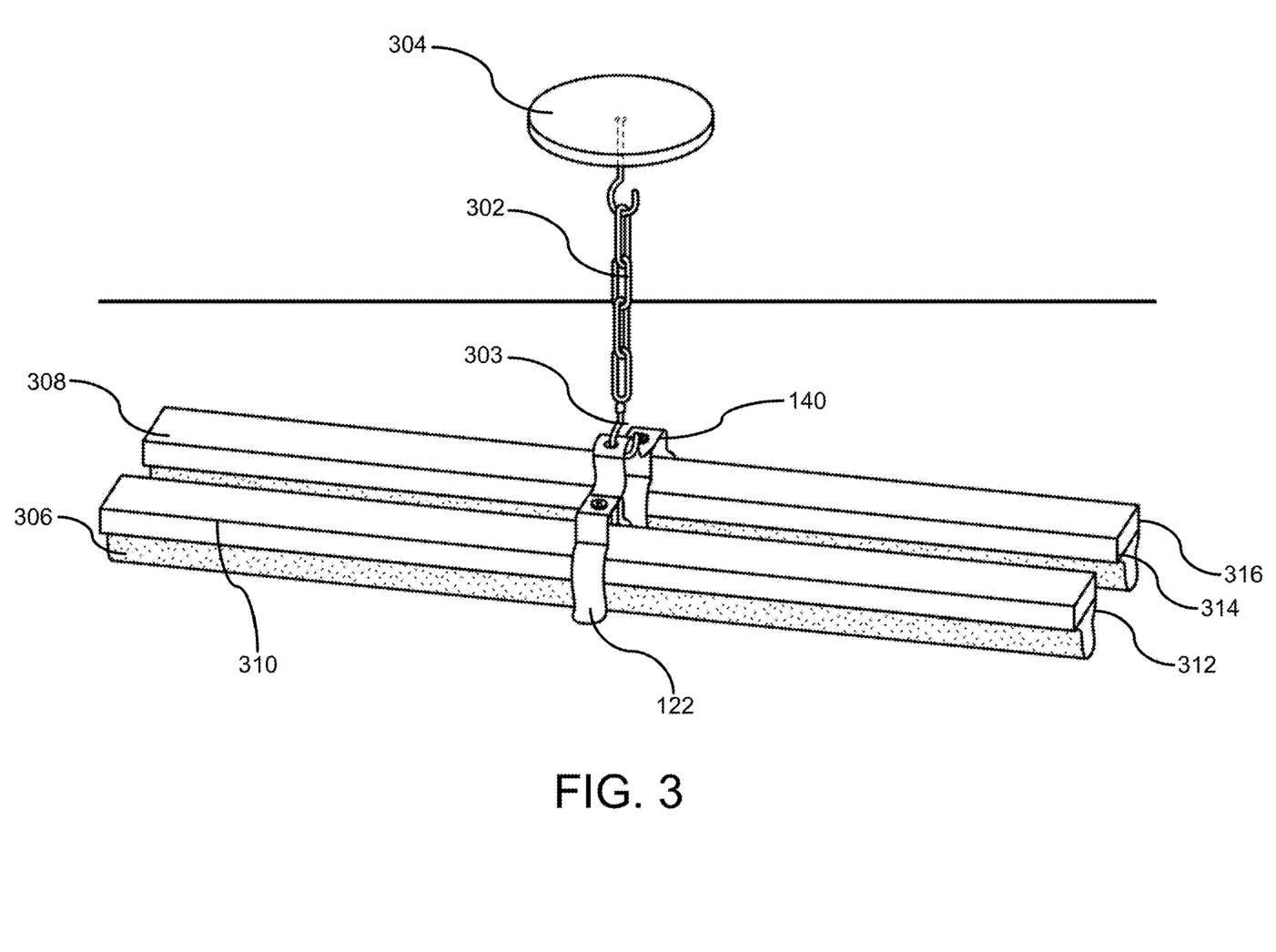
FIG. 3 illustrates a perspective view showing the bracket device of the present invention in use for hanging a pair of lights or light fixtures from a ceiling in accordance with the disclosed structure.

FIG. 3 illustrates a perspective view showing bracket device of the present invention in use for hanging a pair of lights from a ceiling in accordance with the disclosed structure. As illustrated, a link chain or any other hanging means 302 is removably fastened to the aperture 104 using a fastener 303 and the chain is used for hanging the bracket device 100 from a ceiling 304.

Figure 4:
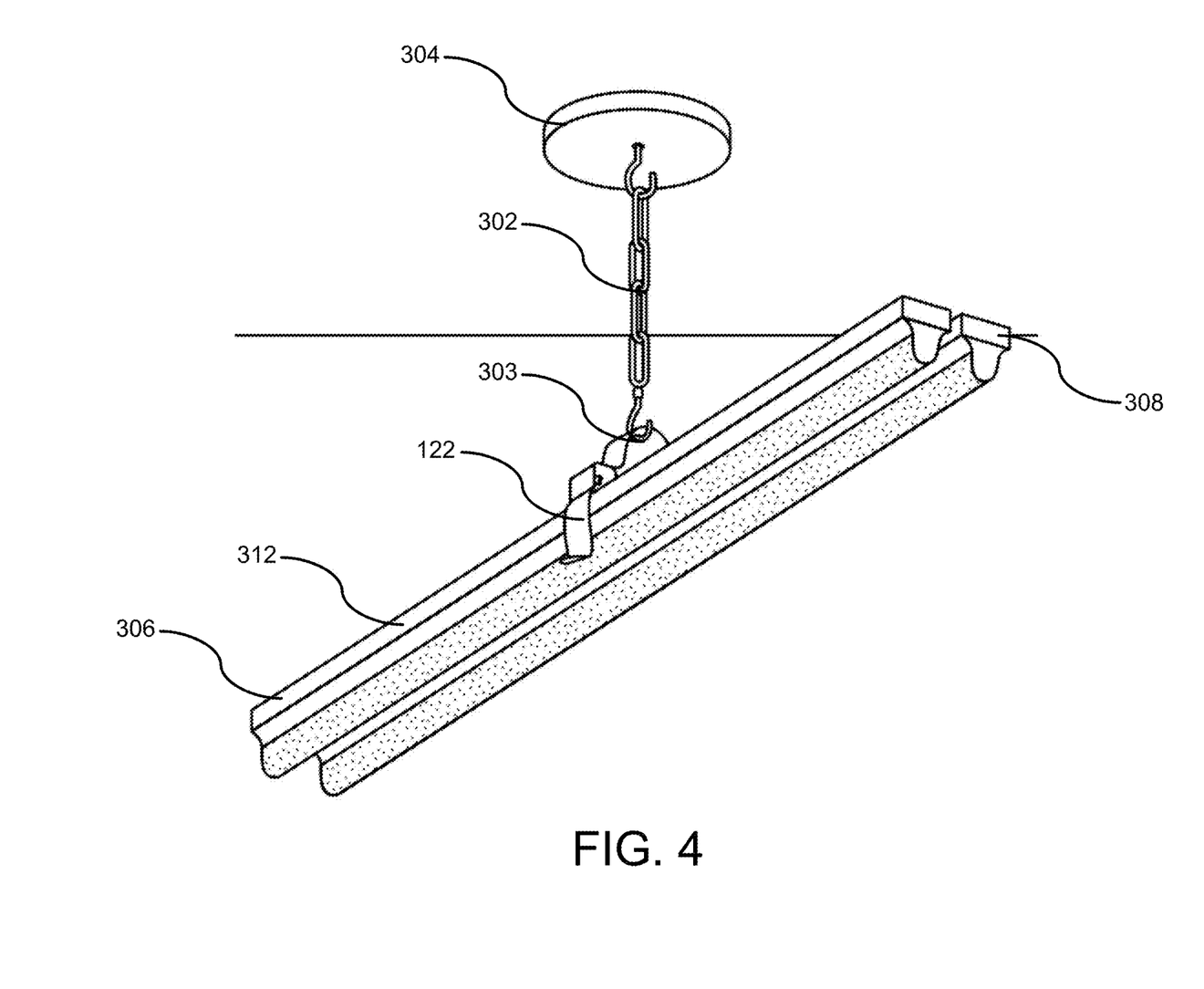
FIG. 4 illustrates another perspective view showing bracket device of the present invention in use for hanging a pair of lights or light fixtures from a ceiling in accordance with the disclosed structure.

The clamp members 122, 140 are oriented below the U-shaped main frame 102 and two LED or any other lights 306, 308 are removably secured to the clamp members 122, 140 respectively. Referring to FIGS. 3 and 4, the LED light, fluorescent light tube, or light fixture 306 is frictionally secured by the clamp 122 and the curved arms 128, 130 secure the LED light, fluorescent light tube, or light fixture 306, preventing the light fixture 306 from falling. Similarly, the clamp 140 prevents the light fixture 308 from falling. The light fixtures 306, 308 cannot move laterally without application of external force by a user and the bracket device 100 does not obstruct the electrical connections required for operation of the LED light or fluorescent light tubes (i.e., fluorescent light fixtures) 306, 308. The curved arms of the clamp members 122, 140 secure and provide a firm frictional grip along the edges 310, 312 of first light fixture 306 and edges 314, 316 of the second light fixture 308 respectively.

The bracket device 100 is adapted to be positioned at any preferred position along a length of the LED light or fluorescent light tubes (i.e., fluorescent light fixtures) 306, 308 depending on the preferences of users, thereby providing an inclination to the lights 306, 308.

Figure 5:
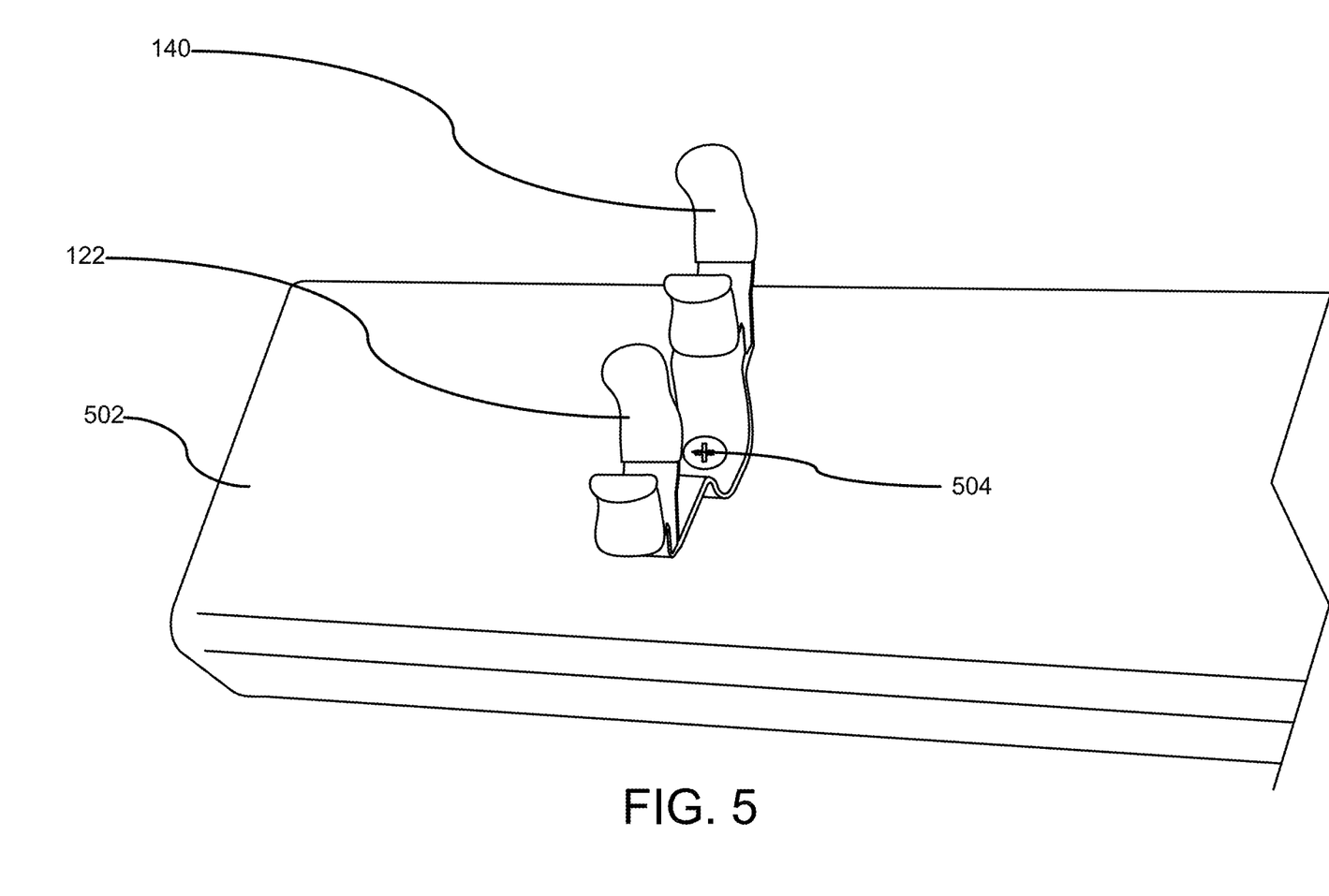
FIG. 5 illustrates a perspective view showing the bracket device being installed on a panel for installation on a wall in accordance with the disclosed structure.

FIG. 5 illustrates a perspective view showing the bracket device being installed on a panel for installation on a wall in accordance with the disclosed structure. The bracket device 100 can be mounted to any surface such as the panel 502 using a mechanical fastener 504 which is passed through the aperture 104. The screw 504 fastens the bracket device 100 securely and the two clamps 122, 140 are easily accessible to a user for sliding the light devices/fixtures or any other objects through the clamps 122, 140. When the bracket device 100 is mounted, the device 100 can be rotated along the fastened screw 504 to orient the device 100 in a preferred direction. The device 100 can also be removed by unfastening the screw 504 and thereby making the process of installation and uninstallation of the device 100 easy and quick without requiring any professional help.

Figure 6:
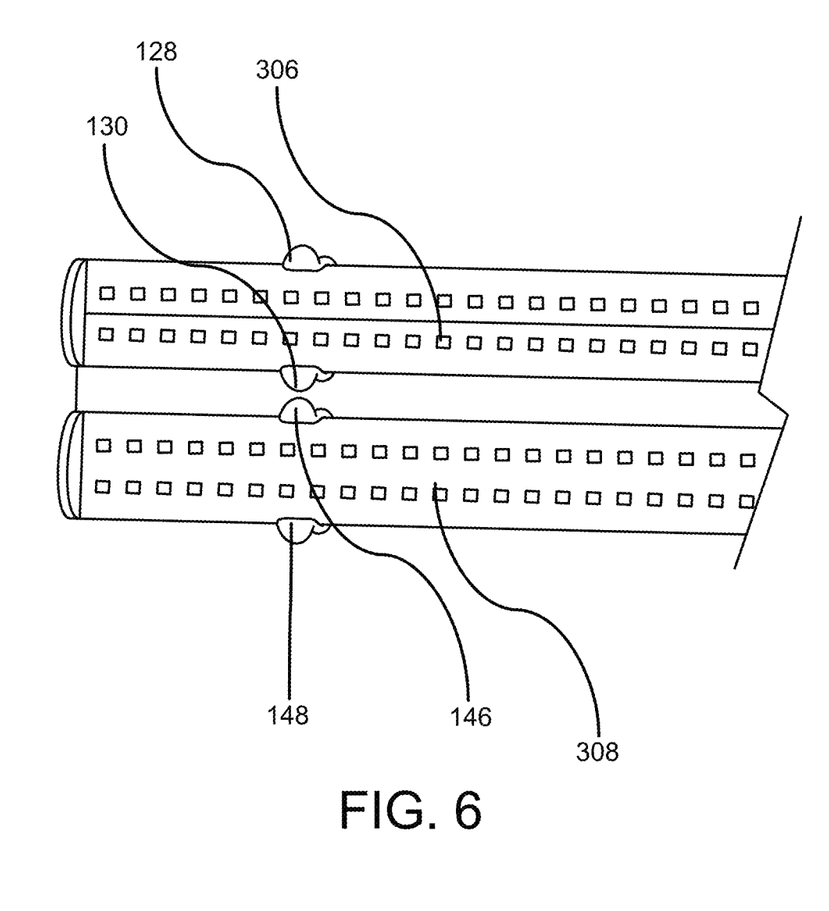
FIG. 6 illustrates a partial front view of the LED light or fluorescent light tubes (i.e., fluorescent light fixtures) secured to the dual light mounting bracket device of the present invention in accordance with the disclosed structure.

FIG. 6 illustrates a partial front view of the LED light or fluorescent light tubes (i.e., fluorescent light fixtures) secured to the dual light mounting bracket device of the present invention in accordance with the disclosed structure. As illustrated, the first light fixture 306 is frictionally secured to the first clamp 122 and the second light fixture 308 is frictionally secured to the second clamp 140. The curved arms of each clamp can be easily pulled using the rounded tips for securing and removing the lights.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "dual light mounting bracket device", "flexible curved clamps integrated dual light mounting bracket device", "mounting bracket device", and "device" are interchangeable and refer to the dual light mounting bracket device 100 of the present invention.

Notwithstanding the forgoing the dual light mounting bracket device 100 of the present invention can be of any suitable size and configuration as is known in the art without affecting the overall concept of the invention, provided that it accomplishes the above stated objectives. One of ordinary skill in the art will appreciate that the dual light mounting bracket device 100 as shown in the FIGS. are for illustrative purposes only, and that many other sizes and shapes of the dual light mounting bracket device 100 are well within the scope of the present disclosure. Although the dimensions of the dual light mounting bracket device 100 are important design parameters for user convenience, the dual light mounting bracket device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A dual light mounting bracket device comprising:
   a dual light mounting bracket;
   a U-shaped main frame;
   an aperture;
   a first light fixture;
   a second light fixture;
   a first planar arm;
   a second planar arm;
   a first clamp member; and
   a second clamp member;
   wherein said first planar arm extending transversely outward from a first end of said U-shaped member;
   wherein said second planar arm extending transversely outward from an opposing second end of said U-shaped member;
   wherein said first planar arm and said second planar arm are horizontally colinear;
   wherein said first clamp member attached to a first upper surface of said first planar arm;
   wherein said second clamp member attached to a second upper surface of said second planar arm;
   wherein said first clamp member having a first rectangular arm and a first pair of symmetrical curved arms;
   wherein said second clamp member having a second rectangular arm and a second pair of symmetrical curved arms;
   wherein said first pair of symmetrical curved arms having said first light fixture frictionally retained therebetween; and
   further wherein said second pair of symmetrical curved arms having said second light fixture frictionally retained therebetween.

2. The dual light mounting bracket device of claim 1, wherein said first pair of symmetrical curved arms having a coating selected from the group consisting of a rubber and a plastic.

3. The dual light mounting bracket device of claim 2, wherein said second pair of symmetrical curved arms having a coating selected from the group consisting of a rubber and a plastic.

4. The dual light mounting bracket device of claim 3, wherein said U-shaped main frame, said first planar, and said second planar arm are of a one-piece construction.

5. The dual light mounting bracket device of claim 4, wherein said first light fixture and said second light fixture are selected from the group consisting of a planar LED light, a fluorescent light tube, and a fluorescent light fixture.

6. The dual light mounting bracket device of claim 5, wherein said U-shaped main frame having said aperture at a top end of said U-shaped main frame.

7. The dual light mounting bracket device of claim 6, wherein said aperture defining an opening for receiving a fastener to secure said dual light mounting bracket to a surface.

8. The dual light mounting bracket device of claim 7, wherein said surface is selected from the group consisting of a wall and a ceiling.

9. The dual light mounting bracket device of claim 7, wherein said first pair of symmetrical curved arms and said second pair of symmetrical curved arms are flexible.

10. A dual light mounting bracket device comprising:
a dual light mounting bracket;
a U-shaped main frame;
an aperture;
a first light fixture;
a second light fixture;
a first planar arm;
a second planar arm;
a first clamp member; and
a second clamp member;
wherein said first planar arm extending transversely outward from a first end of said U-shaped member;
wherein said second planar arm extending transversely outward from an opposing second end of said U-shaped member;
wherein said first planar arm and said second planar arm are horizontally colinear;
wherein said first clamp member attached to a first upper surface of said first planar arm;
wherein said second clamp member attached to a second upper surface of said second planar arm;
wherein said first clamp member having a first rectangular arm and a first pair of symmetrical curved arms;
wherein said second clamp member having a second rectangular arm and a second pair of symmetrical curved arms;
wherein said first pair of symmetrical curved arms having said first light fixture frictionally retained therebetween;
wherein said second pair of symmetrical curved arms having said second light fixture frictionally retained therebetween; and
further wherein said dual light mounting bracket secured at a selected position along a length of said first light fixture and said second light fixture.

11. The dual light mounting bracket device of claim 10, wherein said first pair of symmetrical curved arms having a coating selected from the group consisting of a rubber and a plastic.

12. The dual light mounting bracket device of claim 11, wherein said second pair of symmetrical curved arms having a coating selected from the group consisting of a rubber and a plastic.

13. The dual light mounting bracket device of claim 10, wherein said U-shaped main frame, said first planar, and said second planar arm are of a one-piece construction.

14. The dual light mounting bracket device of claim 10, wherein said first light fixture and said second light fixture are selected from the group consisting of a planar LED light, a fluorescent light tube, and a fluorescent light fixture.

15. The dual light mounting bracket device of claim 10, wherein said U-shaped main frame having said aperture at a top end of said U-shaped main frame.

16. The dual light mounting bracket device of claim 10, wherein said aperture defining an opening for receiving a fastener to secure said dual light mounting bracket to a surface.

17. The dual light mounting bracket device of claim 16, wherein said surface is selected from the group consisting of a wall and a ceiling.

18. The dual light mounting bracket device of claim 10, wherein said first pair of symmetrical curved arms and said second pair of symmetrical curved arms are flexible.

19. A dual light mounting bracket device comprising:
a dual light mounting bracket;
a U-shaped main frame;
an aperture;
a first light fixture;
a second light fixture;
a first planar arm;
a second planar arm;
a first clamp member; and
a second clamp member;
wherein said first planar arm extending transversely outward from a first end of said U-shaped member;
wherein said second planar arm extending transversely outward from an opposing second end of said U-shaped member;
wherein said first planar arm and said second planar arm are horizontally colinear;
wherein said first clamp member attached to a first upper surface of said first planar arm;
wherein said second clamp member attached to a second upper surface of said second planar arm;
wherein said first clamp member having a first rectangular arm and a first pair of symmetrical curved arms;
wherein said second clamp member having a second rectangular arm and a second pair of symmetrical curved arms;
wherein said first pair of symmetrical curved arms having said first light fixture frictionally retained therebetween;
wherein said second pair of symmetrical curved arms having said second light fixture frictionally retained therebetween;
wherein said dual light mounting bracket secured at a selected position along a length of said first light fixture and said second light fixture;
wherein said first light fixture and said second light fixture are selected from the group consisting of a planar LED light, a fluorescent light tube, and a fluorescent light fixture;
wherein said first pair of symmetrical curved arms having a coating selected from the group consisting of a rubber and a plastic; and
further wherein said second pair of symmetrical curved arms having a coating selected from the group consisting of a rubber and a plastic.

20. The dual light mounting bracket device of claim 19, wherein said first pair of symmetrical curved arms and said second pair of symmetrical curved arms are flexible.

\* \* \* \* \*